No. 842,162. PATENTED JAN. 29, 1907.
J. F. APPLEBY.
COTTON HARVESTING MACHINE.
APPLICATION FILED AUG. 11, 1906.
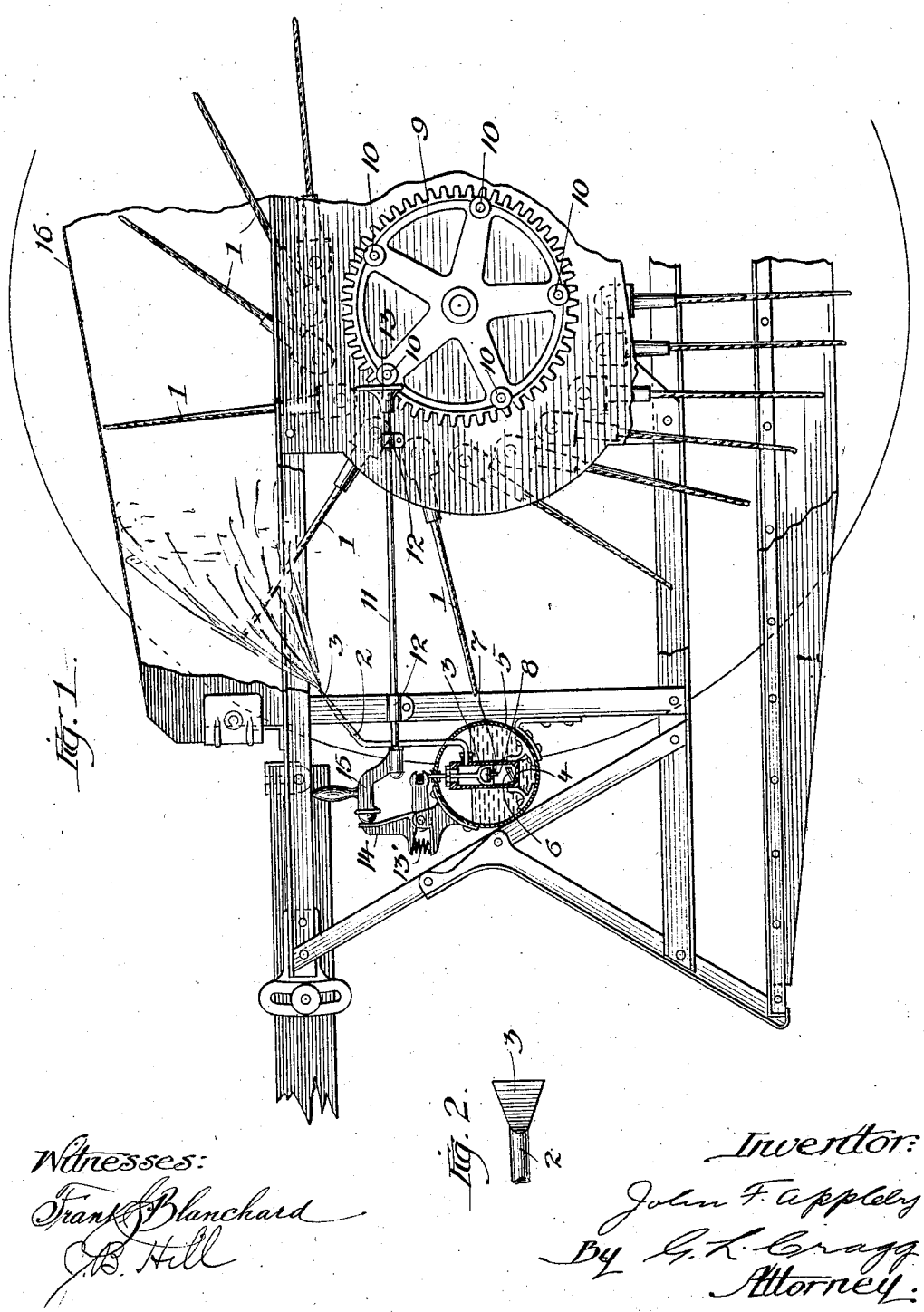

UNITED STATES PATENT OFFICE.

JOHN F. APPLEBY, OF CHICAGO, ILLINOIS.

COTTON-HARVESTING MACHINE.

No. 842,162.  Specification of Letters Patent.  Patented Jan. 29, 1907.

Application filed August 11, 1906. Serial No. 330,126.

*To all whom it may concern:*

Be it known that I, JOHN F. APPLEBY, a citizen of the United States, residing at Chicago, in the county of Cook and State of Illinois, have invented a certain new and useful Improvement in Cotton-Harvesting Machines, of which the following is a full, clear, concise, and exact description, reference being had to the accompanying drawings, forming a part of this specification.

My invention relates to cotton picking or harvesting machines, and has for its object the provision of means for preventing the cotton-picking fingers from gathering foreign material, such as sap or moisture, that would impair the efficiency of the fingers.

In practicing my invention I employ a receptacle for material that is to be applied to the fingers for the purpose indicated, this receptacle having an opening in a wall portion thereof, which wall portion constitutes a duct through which the material may be directed to the fingers. In the preferred embodiment of the invention the receptacle is placed in such a position that this duct or pipe portion is considerably removed from the fingers, in which case I preferably supplement the same by an additional duct or pipe portion in the form of a tube set into the opening in the receptacle. The material that I prefer to employ for application to the fingers is kerosene, and this kerosene is desirably forced through the duct toward the fingers to form a spray, which reaches the space that the fingers are to occupy when they are being treated to an application of the kerosene.

In the preferred embodiment of the invention the oil-receptacle is preferably so located that gravity is not relied upon to cause the oil to be sprayed, and I therefore desirably employ a pump which will effect the forcible emission of the oil through the duct. The jet of oil is preferably fan-shaped in plan view, to which end the nozzle of the duct is flattened.

In order that the stream of oil may be caused to flow intermittently only, I employ a device which intermittently shuts off the connection between the duct and the oil-supply, this mechanism being desirably operated by some rotating element of the machine operated by the traction-wheels thereof, and I broadly claim herein the mechanism for effecting the intermittent application of oil or other material to the fingers. I also provide means whereby the flow of oil through the duct may be totally discontinued when desired.

I will explain my invention more fully by reference to the accompanying drawings, illustrating the preferred embodiment thereof, in which—

Figure 1 is a side elevation of so much of the type of cotton-picking machine, together with mechanism employed in association therewith, as is necessary to an understanding of the invention. Fig. 2 is a plan view of the nozzle of the pipe or duct through which oil is sprayed upon the fingers.

Like parts are indicated by similar characters of reference throughout the different figures.

Some of the mechanism shown in Fig. 1 of the drawings forms the subject-matter of my United States Letters Patent No. 798,651 and dated September 5, 1905; but I do not wish to be limited to the precise harvesting mechanism that I have illustrated.

In the drawings there is disclosed a plurality of picking-fingers 1, that are mounted bodily in vertical planes parallel with the line of travel of the harvester and each adapted to be rotated about its axis while picking cotton by mechanism fully disclosed in my aforesaid patent and which need not here be mentioned in detail.

The picking-fingers are desirably tapered and serrated and the kerosene is desirably applied to the entire surfaces of the fingers that are likely to contact with the bushes. The oil finds passage through the pipe or duct 2, which is preferably provided with a flattened nozzle, as indicated at 3, Fig. 2, whereby the oil issues from the duct in a fan-shaped spray that extends transversely of the machine. Where a pump-feed action is employed, the pipe 2 desirably extends downwardly into connection with the upper portion of the pump-barrel 3, an opening being afforded in this pump-barrel, the pipe 2 being brought into communication with said opening. The pump-barrel itself also constitutes a duct portion, and the apertured bottom 4 of the pump-barrel also constitutes a duct portion, the oil in the tank 5 being conveyed through said duct portions and the nozzle 3 whenever the pump is set into operation, as will appear.

A valve 6 is provided for opening and closing the aperture in the bottom 4 of the pump-barrel, this valve 6 being raised for the admission of oil from the chamber 5 whenever the piston 7 of the pump is raised to eject oil through the duct 2. It need hardly be said that when the piston is depressed the valve 6 is closed and that said piston is itself provided with a valve 8, that permits the oil to rise above the piston as the piston descends. The piston is intermittently operated by some moving part of the machinery of the harvester, and I have for sake of convenience selected as such a moving part one of the operating-gears 9, provided upon which is a suitable actuating agency, desirably in the form of a plurality of rollers 10, distributed at equal distances along the periphery of the gear 9.

A horizontal rod 11, disposed in suitable guides 12, is provided with a foot 13, that is normally pressed toward the gear 9 by means of some spring mechanism—as, for example, the spring 13'—said spring exerting its action upon said rod 11 through the agency of the upright arm of a bell-crank 14, that engages an angular addition 15 to the rod 11. The other end of said bell-crank has cross-head connection with the stem or shaft of the piston 7. The spring 13', which has a stationary abutment at its lower end, not only operates to press the foot 13 toward the rollers 10, but also operates to move the piston downward as each roller disengages itself from the foot. When, however, a roller engages itself with the foot, the spring 13 is compressed by the action of the rod 11 and associate parts, said rod then being moved by the engaging roller toward the bell-crank 14 to effect the elevation of the piston, and thereby the ejection of oil through the spout or nozzle 3. In this way the material that is to be applied to the fingers is caused to be fed intermittently, and this I consider to be a very important characteristic of the invention herein disclosed, though I do not wish to be limited thereto in all embodiments of the invention.

Where it is desired to throw the sprinkling apparatus out of service altogether, the angular extension 15 upon the rod 11 may be rotatably mounted upon said rod 11, so that it may be swung to one side to have its free end out of the path of the upright arm of the bell-crank lever, the engagement between the parts 11 and 15 being with sufficient friction to enable the element 15 to be maintained in any position to which it is swung.

The oil is not only directly cast upon the fingers through the pipe 2, but a part of the oil may be permitted to strike the inside of the cover 16, from which the oil may drop onto the fingers.

While I have herein shown pumping mechanism for forcibly ejecting the material that is to be applied to the fingers, I do not wish to be limited to a mechanism by which such forcible ejection is had.

In the claims I speak of dropping or otherwise applying oil or other suitable material upon the cotton-picking fingers, meaning thereby that said oil or other material is applied to the portions of the fingers that project into the cotton-plants.

It is obvious that changes may be made in the embodiment of the invention herein shown and particularly described without departing from the spirit of the invention, and I do not, therefore, wish to be limited to the precise construction shown; but,

Having thus described my invention, I claim as new and desire to secure by Letters Patent—

1. A cotton-picking machine including cotton-picking fingers, and a spraying device for applying material to the fingers.

2. A cotton-picking machine including cotton-picking fingers, and means out of contact with the fingers for dropping material upon the fingers.

3. A cotton-picking machine including cotton-picking fingers, a receptacle for holding material to be applied to the fingers, having a pipe or duct portion having a free bore affording unobstructed passage for the material to direct such material to the fingers.

4. A cotton-picking machine including cotton-picking fingers, a spraying device for applying material to the fingers, and means for forcibly effecting the passage of said material through said spraying device.

5. A cotton-picking machine including cotton-picking fingers, a receptacle for holding material to be applied to the fingers, having a pipe or duct portion having a free bore affording unobstructed passage for the material to direct such material to the fingers, and means for effecting the forcible discharge of said material through said duct portion.

6. A cotton-picking machine including cotton-picking fingers, a spraying device for applying material to the fingers, and pumping mechanism forcibly effecting the passage of said material through said spraying device.

7. A cotton-picking machine including cotton-picking fingers, a receptacle for holding material to be applied to the fingers, having a pipe or duct portion to direct such material to the fingers, and pumping mechanism for effecting the forcible discharge of said material through said duct portion.

8. A cotton-picking machine including cotton-picking fingers, a receptacle for holding material to be applied to the fingers, and means for effecting the forcible discharge of material from said receptacle.

9. A cotton-picking machine including cotton-picking fingers, a receptacle for holding material to be applied to the fingers, and pumping mechanism for effecting the forcible discharge of material from said receptacle.

10. A cotton-picking machine including cotton-picking fingers, a receptacle for holding material to be applied to the fingers, and means for projecting said material upon the fingers.

11. A cotton-picking machine including cotton-picking fingers, a receptacle for holding material to be applied to the fingers, and pumping mechanism for projecting said material upon the fingers.

12. A cotton-picking machine including cotton-picking fingers, and intermittently-operating means for applying material carried by the machine to said fingers.

13. A cotton-picking machine including cotton-picking fingers, and means intermittently operated by mechanism of the machine for applying material carried by the machine to said fingers.

14. A cotton-picking machine including cotton-picking fingers, means for applying material carried by the machine to said fingers, and means for arbitrarily throwing the aforesaid means out of action.

In witness whereof I hereunto subscribe my name this 8th day of August, A. D. 1906.

JOHN F. APPLEBY.

Witnesses:
G. L. CRAGG,
LEON G. STROH.